United States Patent

[11] 3,596,716

| [72] | Inventor | Carl C. Hoffman<br>Monte Vista, Colo. |
|---|---|---|
| [21] | Appl. No. | 732,355 |
| [22] | Filed | May 27, 1968 |
| [45] | Patented | Aug. 3, 1971 |
| [73] | Assignee | Lockwood Corporation<br>Gering, Nebr. |

[54] PNEUMATIC POTATO HARVESTERS
9 Claims, 5 Drawing Figs.

[52] U.S. Cl.................................................. 171/17,
209/136
[51] Int. Cl..................................................... A01d 17/00
[50] Field of Search........................................... 171/17, 18,
14; 130/27.9 T; 209/136, 137, 138

[56] References Cited
UNITED STATES PATENTS

| 1,984,826 | 12/1934 | Bunker...................... | 171/18 |
| 2,373,426 | 4/1945 | Spafford..................... | 171/17 |
| 3,107,475 | 10/1963 | Gustafson.................... | 171/17 |
| 3,469,691 | 9/1969 | Boyce........................ | 171/17 X |
| 3,428,172 | 2/1969 | Hoffman..................... | 209/136 |

Primary Examiner—Antonio F. Guida
Attorney—White and Haefliger

ABSTRACT: Conventional digger chains delivering directly into the intake of a vacuum chamber and directly onto a potato removal conveyor over adjustable flexible flaps which individually flex downwardly to discharge rocks from the potato stream and flex upwardly to control the air stream.

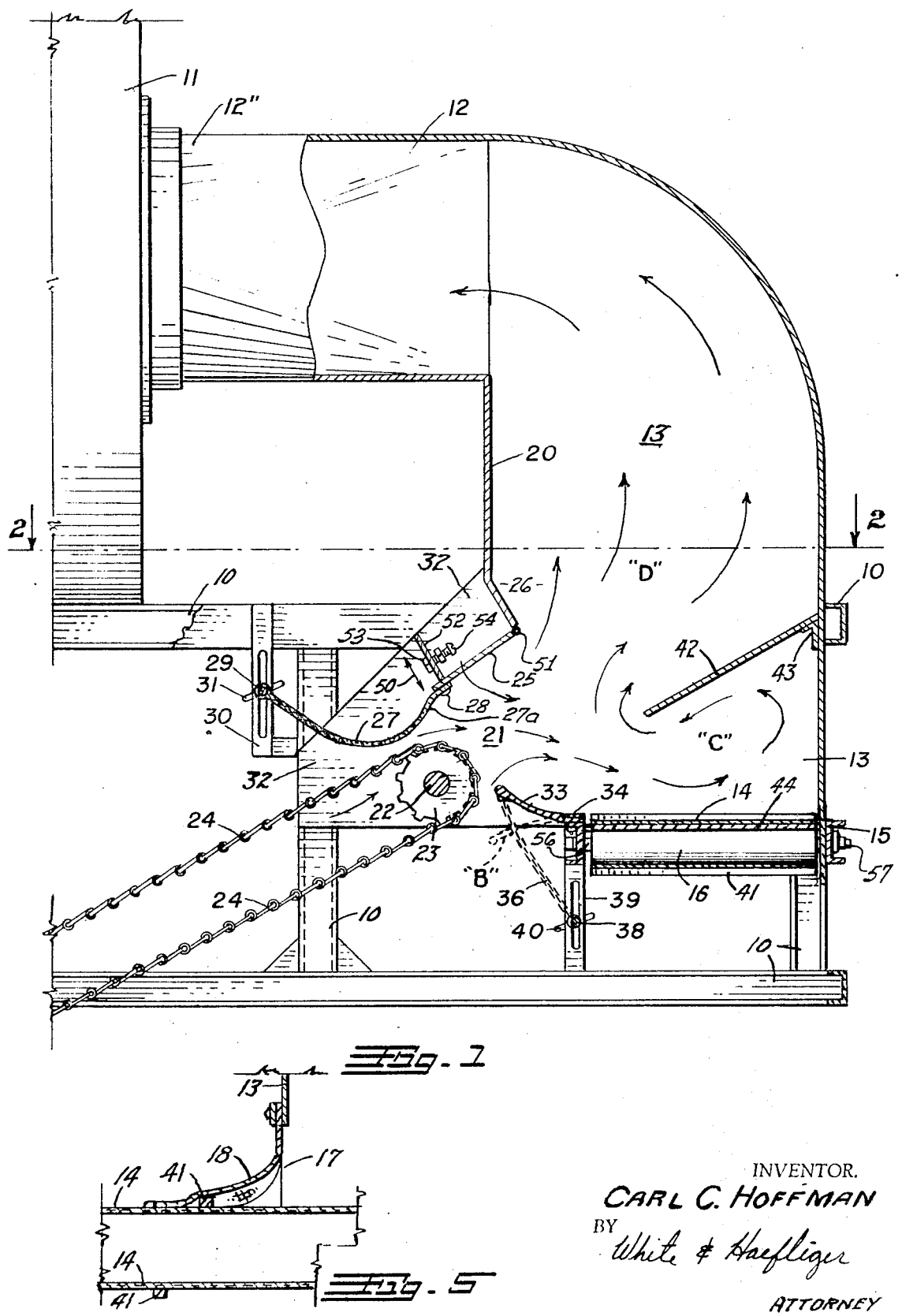

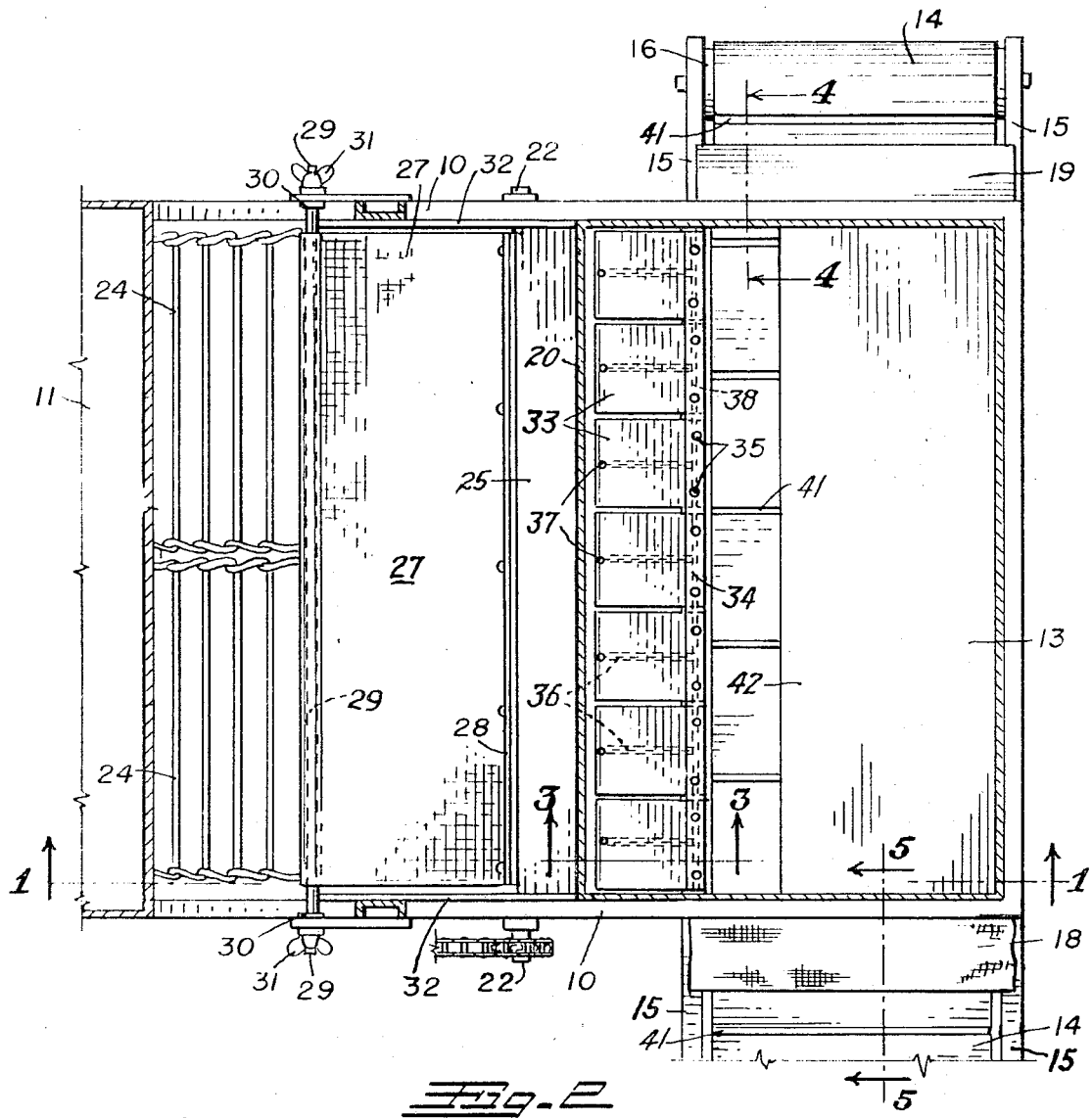
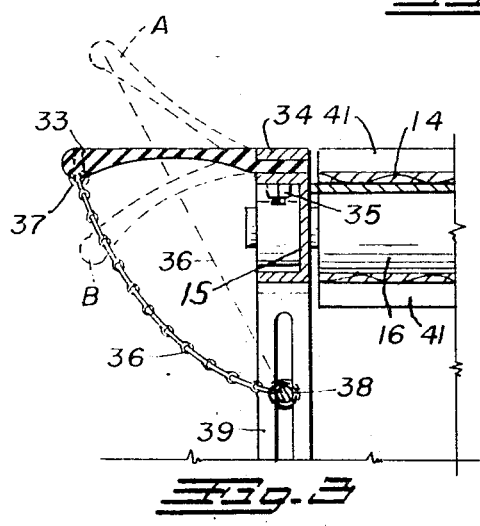
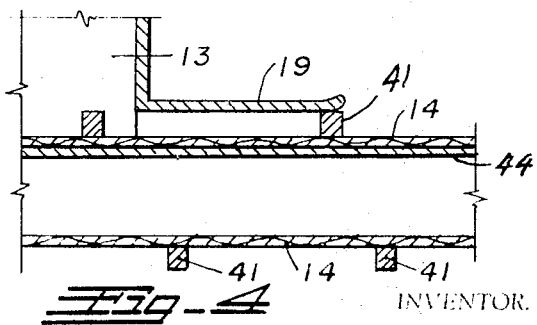
INVENTOR.
CARL C. HOFFMAN
BY
White & Haefliger
ATTORNEY

PNEUMATIC POTATO HARVESTERS

This invention relates to portable potato harvesting machines and more particularly to a highly efficient, pneumatic separating mechanism for potato harvesting machines which will efficiently, continuously, rapidly and pneumatically separate the potatoes from the earth, rocks, vines and other dross material encountered, with a minimum of brushing impacts and with a minimum power requirement.

A further object is to provide a pneumatic separating mechanism for potato harvesters in which the potatoes arising from the digging mechanism will be air-floated directly to the potato delivering mechanism without intervening conveyors or other mechanical contact such as normally result in a high percentage of bruised potatoes.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a longitudinal vertical section through the pneumatic separating mechanism of the improved harvester as it would appear in use, the section being taken on the line 1–1, FIG. 2;

FIG. 2 is a horizontal section through the separating mechanism looking downwardly on the line 2–2, FIG. 1;

FIG. 3 is an enlarged, fragmentary, detail section taken on the line 3–3, FIG. 2;

FIG. 4 is a similar detail section taken on the line 4–4, FIG. 2; and

FIG. 5 is a similar, enlarged, detail section taken on the line 5-5, FIG. 2.

Conventional potato harvesters are mounted upon a suitable wheeled chassis, so that they may be driven or drawn along the rows of potatoes in a field, and are provided with conventional forwardly extending digger blades which lift the potato plants onto inclined chain conveyors which elevate and deliver a stream of the dug material to the harvester for separation of the potatoes from the accumulated extraneous material such as from the rocks, clods, leaves, stalks and roots. Since the above elements are conventional with substantially all potato harvesters, they have been omitted from the drawing and this specification is devoted more specifically the the separation means of the harvester. Conventional supporting frame elements of the harvester are indicated at 10.

The frame elements 10 support a suitable power-driven suction fan 11 which intakes through an intake conduit 12 from the upper portion of a vertical, transversally elongated, rectangular, vacuum chamber 13 which is supported by the frame elements 10 rearwardly of the fan 11. The forward extremity of the intake conduit 12 is reduced in width and is cylindrically formed as indicated at 12" to concentrically enter the intake of the fan 11.

The rear portion of the bottom of the vacuum chamber 13 is closed by a transversally extending bottom plate 44 upon which the upper reach of a transversally extending power-driven, potato delivery belt 14, provided with suitable cleats 41, is slidably mounted. The belt 14 is supported in a horizontal belt conveyor frame 15 and is trained over an idler roller 16 at one side of the vacuum chamber and extends through a delivery opening 17 at the other side thereof to any suitable conventional potato receiving station. A flexible curtain 18 of canvas or other suitable flexible sheet material, depends from the sidewall of the vacuum chamber over the delivery opening 17 so as to freely lie upon the exiting belt 14, and the exiting potatoes thereon to resist air entry to the vacuum chamber. In operation, the curtain 18 is continuously forced to the closed position by atmospheric pressure, yet, can be freely urged outwardly by the outwardly traveling potatoes.

Air is prevented from entering at the first side of the vacuum chamber adjacent the idler roller 16 by a sealing plate 19 which extends horizontally outward over the entering upper reach of the delivery belt 14. The plate 19 is spaced above the belt 14 sufficiently to allow the cleats 41 to slide thereunder as shown in FIG. 4. The cleats are maintained in frictional, sealing engagement with the plate 19 by the bottom plate 44. The sealing plate 19 is sufficiently wide to exceed the spacing between the cleats so as to enable each successive cleat to come into sealing contact with the plate before the preceding cleat leaves the plate so that a pneumatic seal is maintained at all times. The front wall of the vacuum chamber, indicated at 20, terminates above the plane of the upper reach of the belt 14 to form an open intake throat 21 across the entire transverse width of the chamber 13 through which the air enters the latter.

A power-driven upper sprocket shaft 22, provided with chain sprockets 23, is journaled in the throat 21 and extends between forwardly projecting portions 32 on the sidewalls of the vacuum chamber 13. A pair of conventional, open, bar-type digger chains 24 are trained over the sprockets 23 and extend forwardly and downwardly to the conventional plant digging elements of the harvester to elevate the dug potato plants and debris as is customary with potato diggers and harvesters.

The lower extremity of the front wall 20 extends forwardly and downwardly, as shown at 25, to form an elongated, rectangular pocket 26, to be later described. An elongated, flexible intake curtain 27 is attached at its forward edge, as shown at 28, to the lower extremity of the front wall over and above the sprocket shaft 22 throughout the entire width of the vacuum chamber. The forward edge of the intake curtain 27 is attached to a horizontal suspension rod 29 which is vertically adjustable, relative to the frame elements 10, in slotted hangers 30 in which the rod may be fixedly clamped in any desired manner such as by means of suitable clamp nuts 31. The intake curtain 27 is formed of rubberized fabric or similar flexible sheet material and freely drapes downwardly from the attachment 28 toward the digger chains 24 thence rearwardly and upwardly to the suspension rod 29. The intake curtain 27 freely flexes over the excavated material being carried upwardly by the digger chains 24 and directs the incoming airstream into close proximity with the material so that the latter will be pneumatically carried rearwardly into the vacuum chamber in the same direction that the material is traveling on the digger chains, thus greatly increasing the efficiency of the incoming airstream.

A baffle plate 42 is fixedly attached to the rear wall of the vacuum chamber 13, as indicated at 43, and extends throughout the entire transverse width of the chamber. The baffle plate is inclined forwardly and downwardly into the incoming airstream over the delivery belt so as to horizontally divide the incoming air into a lower whirling zone "C" and upper rising zone "D" as sown in FIG. 1.

The lower portion of the front wall throat 21 is resiliently closed by an inclined apron consisting of an aligned plurality of flexible flaps 33 molded of rubber or other suitable, flexible, resilient material. The flaps 33 are rectangular and are individually secured in horizontal alignment at their rear edges by means of an elongated clamp bar 34 secured, by suitable capscrews or bolts 35, to the forward side of the belt conveyor frame 15 slightly above the plane of the upper reach of the delivery belt 14 and slightly below the plane of the axis of the sprocket shaft 22 with their forward edges in relatively close spaced-relation to the sprockets 23 and the digger chains 24.

The flaps 33, when unflexed, lie in substantially a horizontal plane, as shown in solid line in FIG. 3. However, when operating, the incoming airstream will lift and resiliently support the forward extremities thereof, as shown in broken line at "A" in FIG. 3, so as to increase the spacing between the forward edges of the flaps and the downwardly traveling digger chains 24. The degree of lift of each flap is limited by a stop chain 36, with which each flap is provided. Each chain 36 is secured at its upper extremity in any suitable manner, such as by means of an eyebolt 37, to one of the flaps. The chains are of uniform length and are all secured at their lower extremities to an adjustable, horizontal chain bar 38. The chain bar 38 is arranged for horizontal adjustment in any suitable manner. As illustrated, the chain bar is mounted, at its opposite extremities, in vertical, slotted guide elements 39 at opposite sides of the harvester, in which the chain bar may be locked at any desired height, by means of conventional clamp nuts 40, to preset the desired operating distance or throat between the flaps 33 and the digger chains 24. The flaps can also be individually flexed downwardly, as indicated in broken line at "B" in FIG. 3, by stones, rocks, clods and other heavy solid debris delivered by the digger chains.

It is believed the operation of the invention can be understood from the above detailed description of its structure. Briefly, the earth, rocks, potatoes and vines are carried upwardly and rearwardly by the digger chains and delivered directly into the vacuum chamber 13. The loose excavated earth will fall through the open digger chains, as is customary with root crop harvesters, and the vines and other lightweight trash will be drawn upwardly through the vacuum chamber 13 to the fan 11. The smaller rocks will follow the digger chains around the upper sprockets 23 and fall to the ground through the open space between the forward edges of the flaps 33 and the chains 24. The larger rocks and clods will fall onto one or more of the flaps 33 and the latter will instantly flex to allow the latter rocks and clods to fall to the ground, after which the flaps will return to their original preset air-directing position.

The incoming potatoes are impelled rearwardly in a substantially horizontal plane from the discharge of the digger chains across the airstreams entering the front wall throat 21 and across the flaps 35 to the delivery belt. During their travel they are pneumatically supported or floated by the incoming air so that they reach the belt 14 without any bruising physical contacts. The whirling air in the zone "C" retards the rearward travel of the potatoes to prevent damaging contact with the rear wall of the vacuum chamber.

The rectangular transverse pocket 26 creates a counterclockwise eddy current in the throat 21 to assist the gravitational separation. The air sweeping upwardly and rearwardly over the flaps creates a partial vacuum over the flaps 33 and over the delivery belt 14, similarly to the partial vacuum created by the airfoil of an aircraft wing, to assist in the deposition of the potatoes on the belt. The airstream components can be accurately and relatively adjusted for efficient gravitational separation by preadjusting the sag in the intake curtain 27 and the lengths of the stop chains 36 to control the airstreams entering the throat 21.

It is desired to call attention to the fact that material to be separated is supported by, and moving substantially across, vertically directed airstreams. This has been found to be much more efficient than having the materials and air moving in the same direction.

The portion 27a of the upper flap or hood 28 is also adjustable in the direction of arrows 50, to vary the size of the throat 21, thereby to adjust the velocity of air which transports potatoes rearwardly as described. For this purpose, the lower extent 25 of front wall 20 may be hinged as at 51 so as to be swingable with flap portion 27a in the general direction of arrows 50. An adjustable clamp to position the flap portion 27a may take the form of rod 52 attached to the flap and wall extent 25, and adjustably received in a guide 53 for setscrew clamping at 54.

Note also that the lower flaps or curtains 33 may be bodily displaced forwardly and rearwardly, to adjust the gap between the flaps and the digger chain 24. This is accommodated by the attachment of clamp bar 34 to the elongated horizontal fastener 56, which may be adjustably connected at 57 to the frame 15 so as to facilitate such adjustment.

It is also to be noted that the invention makes possible a separation of potatoes from dross materials with minimum travel of the potatoes to minimize possible bruising. In this regard, the digger chain assembly 24 has its lower and forward extent proximate the ground from which potatoes are being dug, the potatoes and rocks being suspended on the chain assembly and advanced rearwardly and upwardly for separation as described. There is no transfer to other conveyors before such separation, whereby the potatoes are not tumbled with the rocks prior to such separation.

While a specific form of the invention has been described and illustrated herein, it is to be understood that the same may be varied within the scope of the appended claims, without departing from the spirit of the invention.

I claim:

1. Apparatus for digging and separating potatoes from a stream of intermixed potatoes and dross materials of greater density than potatoes, said materials including rocks, said apparatus comprising structure including a potato receiving chamber and forming a restricted cross section intake communicating with the chamber interior, said intake opening relatively forwardly, an endless potato digger chain assembly to support potatoes at the point of digging and to travel the potatoes and heavier dross materials along a path extending rearwardly and upwardly and into close proximity to said intake, there being a discharge zone beneath said intake and rearward of said digger chain assembly, and means including a blower communicating with said chamber for effecting airflow at such high velocity in a rearward direction along said path proximate said digger chain and rearwardly through said intake that potatoes are effectively transported bodily rearwardly in the airstream off the upper and rearward terminal of the chain assembly proximate said intake to the chamber interior via the intake, said structure including a flexible flap projecting forwardly over said discharge zone and toward the chain assembly at an elevation to assist in confining the airflow rearwardly through said intake and to be downwardly flexible to pass rocks dumped off the chain assembly rearward terminal during assembly operation, said flap having an upwardly flexed position induced by suction creation in said chamber, said flap including multiple sections spaced transversely of the chain assembly terminal, said sections being supported for individual and separate flexing, and control means to limit upward flexing of said sections.

2. Apparatus as defined in claim 1 including means to bodily displace the flap forwardly and rearwardly.

3. Apparatus for digging and separating potatoes from a stream of intermixed potatoes and dross materials of greater density than potatoes, said materials including rocks, said apparatus comprising structure including a potato-receiving chamber and forming a restricted cross section intake communicating with the chamber interior, said intake opening relatively forwardly, an endless potato digger chain assembly to support potatoes at the point of digging and to travel the potatoes and heavier dross materials along a path extending rearwardly and upwardly and into close proximity to said intake, there being a discharge zone beneath said intake and rearward of said digger chain assembly, means including a blower communicating with said chamber for effecting airflow at such high velocity in a rearward direction along said path proximate said digger chain and rearwardly through said intake that potatoes are effectively transported bodily rearwardly in the airstream off the upper and rearward terminal of the chain assembly proximate said intake to the chamber interior via the intake, said structure including a flexible flap projecting forwardly over said discharge zone and toward the chain assembly at an elevation to assist in confining the airflow rearwardly through said intake and to be downwardly flexible to pass rocks dumped off the chain assembly rearward terminal during assembly operation, said flap having an upwardly flexed position induced by suction creation in said chamber, said structure including a flexible hood projecting forwardly over the digger chain assembly rearward terminal, the hood being downwardly convex in vertical forward planes, and control means to adjust the vertical spacing of the hood from the chain assembly.

4. Apparatus for digging and separating potatoes from a stream of intermixed potatoes and dross materials of greater density than potatoes, said materials including rocks, said apparatus comprising structure including a potato-receiving chamber and forming a restricted cross section intake communicating with the chamber interior, said intake opening relatively forwardly, an endless potato digger chain assembly to support potatoes at the point of digging and to travel the potatoes and heavier dross materials along a path extending rearwardly and upwardly and into close proximity to said intake, there being a discharge zone beneath said intake and rearward of said digger chain assembly, means including a blower communicating with said chamber for effecting airflow at such high velocity in a rearward direction along said path proximate said digger chain and rearwardly through said intake that potatoes are effectively transported bodily rearwardly in the airstream off the upper and rearward terminal of the chain assembly proximate said intake to the chamber interior via the intake, said structure including a flexible flap projecting forwardly over said discharge zone and toward the chain assembly at an elevation to assist in confining the airflow rearwardly through said intake and to be downwardly flexible to pass rocks dumped off the chain assembly rearward terminal during assembly operation, a baffle projecting forwardly in said chamber in rearwardly spaced relation to said intake, the baffle and chamber defining an air swirl zone below the baffle and into which potatoes are received, and the baffle and chamber defining a zone above the baffle through which air entering the chamber via said intake rises in response to blower operation.

5. Apparatus as defined in claim 4 including a transversely moving belt below said swirl zone and adapted to receive said potatoes for removal from said chamber.

6. Apparatus as defined in claim 4 wherein said flap has an upwardly flexed position induced by suction creation in said chamber.

7. Apparatus as defined in claim 6 wherein said structure includes a flexible hood projecting forwardly over the digger chain assembly rearward terminal, the hood being downwardly convex in vertical forward planes.

8. Apparatus as defined in claim 6 wherein said flap includes multiple sections spaced transversely of the chain assembly terminal, said sections being supported for individual and separate flexing.

9. Apparatus as defined in claim 8 including control means to limit upward flexing of said sections.